United States Patent [19]
Crowe

[11] 3,962,102
[45] *June 8, 1976

[54] COMPOSITION AND METHOD FOR ACIDIZING EARTHEN FORMATIONS

[75] Inventor: Curtis W. Crowe, Tulsa, Okla.

[73] Assignee: The Dow Chemical Company, Midland, Mich.

[ * ] Notice: The portion of the term of this patent subsequent to June 8, 1993, has been disclaimed.

[22] Filed: Dec. 17, 1973

[21] Appl. No.: 425,574

Related U.S. Application Data

[63] Continuation-in-part of Ser. No. 402,559, Oct. 1, 1973, abandoned, which is a continuation-in-part of Ser. No. 316,421, Dec. 18, 1972, Pat. No. 3,917,536.

[52] U.S. Cl. ............................ 252/8.55 C; 166/307; 252/309; 252/8.5 P
[51] Int. Cl.² ..................... E21B 43/22; E21B 43/28
[58] Field of Search .................. 166/307; 252/8.5 E, 252/8.55 C, 8.55 D, 309

[56] References Cited
UNITED STATES PATENTS

| | | |
|---|---|---|
| 2,331,594 | 10/1943 | Blair ............................... 252/8.55 D |
| 2,908,643 | 10/1959 | Thompson et al. ............. 252/8.55 D |
| 3,113,113 | 12/1963 | Marsh et al. .................... 252/8.55 C |
| 3,205,169 | 9/1965 | Kirkpatrick et al. ........... 252/8.55 C |
| 3,319,714 | 5/1967 | Knox ................................. 166/307 |
| 3,382,179 | 5/1968 | Keeny et al. .................... 252/8.55 C |
| 3,404,094 | 10/1968 | Keeny ............................. 252/8.55 C |
| 3,434,545 | 3/1969 | Bombardieri ...................... 166/307 |
| 3,681,240 | 8/1972 | Fast ............................... 252/8.55 C |

*Primary Examiner*—Benjamin R. Padgett
*Assistant Examiner*—B Hunt
*Attorney, Agent, or Firm*—Bruce M. Kanuch

[57] ABSTRACT

A subterranean formation (e.g. gas, oil or water bearing formation) is acidized with an emulsion comprising an aqueous acidizing solution, an oil and a cationic surfactant which renders oil-containing earthen formations oil-wet, said surfactant being present in said emulsion in an amount which is sufficient to increase the reaction time of the acid acting on the formation.

11 Claims, No Drawings

COMPOSITION AND METHOD FOR ACIDIZING EARTHEN FORMATIONS

CROSS-REFERENCE TO RELATED APPLICATION

This is a continuation-in-part of application Ser. No. 402,559, filed Oct. 1, 1973, now abandoned, which in turn was a continuation-in-part of application Ser. No. 316,421, filed Dec. 18, 1972 now U.S. Pat. No. 3,917,536.

BACKGROUND OF THE INVENTION

It is oftentimes desirable to increase the distance into a wellbore or earth formation, e.g. a fracture, into which an acidizing solution can act on the formation before it becomes spent, i.e. it is desirable to increase the reaction time of the acid.

Various methods have been utilized to increase the reaction time of various acidizing solutions on acidizable formations. For example, in some instances an emulsion is prepared containing an oil external phase and an acid internal phase (see U.S. Pat. No. 3,681,240). The oil separates the acid from the formation rock and thereby extends the distance into the formation that the emulsion can penetrate before the acid becomes spent.

In another method, an anionic surfactant which renders the surface of a formation oil-wet is dispersed into an acidizing formulation, e.g. U.S. Pat. No. 3,319,714. However, it has been discovered that these types of surfactants are not effective in aqueous solutions containing higher concentrations of acids, e.g. an aqueous solution containing 20 per cent or more by weight of HCl.

SUMMARY OF THE INVENTION

An acidizing emulsion is prepared containing a cationic surfactant which in the presence of said acid renders oil containing formations oil-wet, an aqueous acidizing solution, and an oil. A sufficient amount of said surfactant is employed to stabilize the emulsion and substantially increase the reaction time of the acidizing emulsion.

DETAILED DESCRIPTION OF THE INVENTION

Surfactants which can be employed in the practice of the present invention include $C_8$ to $C_{18}$ primary fatty amines or mixtures thereof, corresponding to the formula $RNH_2$ wherein the R group comprises a $C_8$ to $C_{18}$ alkyl group. Specific surfactants which can be employed include, for example, cocoamine, dodecylamine, tetradecylamine, decylamine, octylamine, and mixtures thereof. Preferably, the surfactant consists primarily of dodecylamine. In this respect, cocoamine, which contains a large portion of dodecylamine, is an example of a surfactant containing more than one fatty amine. The amine can be employed as such or various salts which are soluble in the particular system employed can be utilized. Useful salts include, for example, acetates, chlorides, sulfates, phosphates, nitrates and the like.

The reaction time of any acidizing emulsion used to acidize calcareous formations, e.g. limestone, dolomite and other formations, can be increased by incorporating into the emulsion a sufficient quantity of the above-identified surfactant. There appears to be no critical quantity and the amount employed will depend on such factors as desired increase in reaction time, economic considerations and the like. Suitable results can be obtained when as little as about 0.01, preferably about 0.1, per cent by weight of the surfactant is employed. Economic considerations generally dictate a maximum amount of about 10 per cent by weight of surfactant in the acidizing emulsion.

Acidizing acids which can be employed include: HCl, HF, formic acid, acetic acid, sulfamic acid, various mixtures thereof and other acids which are compatible with the specific surfactants employed. The acid solutions can contain up to about 40 per cent by weight or more of the acid. The surfactants of the present invention are especially useful in acidizing emulsions containing more than about 15 per cent by weight of an acidizing acid, e.g. HCl.

Any liquid hydrocarbon generally employed in the art to prepare acid-in-oil emulsions can be employed. Liquids which can be employed include, for example, crude oil, various grades of diesel oil, fuel oil, kerosene, gasoline, aromatic oils, petroleum fractions, mineral oils and various mixtures thereof.

The liquid hydrocarbon phase can comprise, as per cent by volume, from about 5 to about 95, preferably from about 10 to about 50, per cent of the emulsion.

The method and composition of the present invention is practiced using standard acidizing equipment and procedures well-known in the art. The composition and method can be employed in matrix and fracturing acidizing techniques. Further, the composition may contain other constituents, e.g. clay stabilizers, scale inhibitors, and corrosion inhibitors well-known in the art.

EXAMPLE 1

The following tests were run to compare the reaction rate of emulsions coming within the scope of the present invention with other emulsions and chemically retarded acids which are presently employed in such treatments. The value $C_r$ shown in the following table is a classification parameter developed to provide a means of comparing the effectiveness of different retarded acids. The reaction rates are compared to an unretarded HCl mixture, the $C_r$ value of the HCl mixture being equal to one. The higher the value $C_r$, the slower is the reaction rate of the retarded system.

Acid emulsions were prepared using 30% by volume kerosene and 70% by volume of the indicated acid. The amount of emulsifier is expressed as per cent by volume of the total emulsion.

Reaction rate tests were performed under static conditions using a high pressure reaction rate cell. Reaction rates were run on 1 inch × 1¼ inch Alabama marble coupons which had previously been weighed. The marble coupon and acid were placed in the cell, and the cell pressured with nitrogen to 1000 psi. The test was begun by inverting the cell, thus exposing the coupon to the acid. After 10 minutes, the cell was again inverted, the pressure released, and the coupon removed, dried and weighed. Weight losses and $C_r$ values were then calculated. All tests were performed at 70°F. In all tests, a corrosion inhibitor was employed which did not drastically affect the stability or reaction rate of the emulsion tested. The results of the tests are set forth in the following Table I.

TABLE I

| Test No. | Acid | Emulsifier | Wt. Loss (gm.) | $C_r$ |
|---|---|---|---|---|
| 1 | 15% HCl | Nonemulsified | 1.495 | 1.0 |
| 2 | 15% HCl | 1.0% Alkyl sulfonate ($C_{14}$) 20% Active | 0.019 | 79.0 |
| 3 | 15% HCl | 0.5% " | 0.041 | 36.0 |
| 4 | 15% HCl | 0.25% " | 0.071 | 21.0 |
| 5 | 15% HCl | 2.0% Cocoamine 40% Active | 0.014 | 107.0 |
| 6 | 15% HCl | 1.0% " | 0.014 | 107.0 |
| 7 | 15% HCl | 0.5% " | 0.012 | 124.0 |
| 8 | 15% HCl | 0.25% " | 0.010 | 150.0 |
| 9 | 15% HCl | 0.10% " | 0.013 | 115.0 |
| 10 | 15% HCl | 0.05% " | 0.058 | 26.0 |
| 11 | 15% HCl | 0.025% " | 0.183 | 8.0 |
| 12 | 20% HCl | 1.0% Alkyl sulfonate ($C_{14}$) 20% Active | 0.074 | 20.0 |
| 13 | 28% HCl | 1.0% " | 0.210 | 7.0 |
| 14 | 20% HCl | 1.0% Cocoamine 40% active | 0.018 | 83.0 |
| 15 | 28% HCl | 1.0% " | 0.066 | 23.0 |
| 16 | 15% HCl | 1.0% " | 0.012 | 125.0 |
| 17 | 15% HCl | 1.0% " | 0.008 | 187.0 |
| 18 | 15% HCl | 1.0% Alkyl sulfonate ($C_{14}$) 20% active | 0.013 | 115.0 |
| 19 | 15% HCl | 0.5% Dodecylbenzene sulfonic acid 98% active | 0.088 | 17.0 |
| 20 | 15% HCl | 0.5% " | 0.095 | 16.0 |
| 21 | 15% HCl | 0.4% Dodecylamine | 0.021 | 71.0 |
| 22 | 15% HCl | 0.4% Tetradecylamine | 0.079 | 19.0 |

What is claimed is:

1. A method of acidizing an acid-soluble formation with an acidic solution in which said formation is soluble wherein the normal reaction time of said acid is extended, comprising:
   contacting said formation with a mixture of an aqueous acidizing solution-in-oil emulsion and an effective amount of a cationic surfactant to increase the normal reaction time of said aqueous acidizing solution-in-oil emulsion with said formation, said cationic surfactant consisting of an alkyl $C_8$ to $C_{18}$ primary amine.

2. The method as defined in claim 1 wherein said aqueous acidizing solution contains at least about 15 per cent by weight of an acidizing acid.

3. The method of claim 3 wherein said acidizing acid is HCl.

4. The method of claim 4 wherein the surfactant is dodecylamine.

5. The method of claim 1 wherein the cationic surfactant is dodecylamine.

6. A composition for acidizing a subterranean formation which comprises:
   a mixture of an aqueous acidizing solution-in-oil emulsion and an effective amount of a cationic surfactant to reduce the normal reaction rate of said aqueous acidizing solution-in-oil emulsion with said formation said cationic surfactant consisting of an alkyl $C_8$ to $C_{18}$ primary amine and characterized as rendering the surface of the formation oil-wet.

7. The composition of claim 6 wherein the acidizing solution contains at least about 15 per cent by weight of an acidizing acid.

8. The composition of claim 7 wherein the cationic surfactant is dodecylamine.

9. The composition of claim 10 wherein the acidizing solution contains at least about 15 per cent by weight of HCl.

10. The method of claim 1 wherein the formation contains acid soluble calcareous materials.

11. The composition of claim 7 wherein the subterranean formation contains acid soluble calcareous materials.

* * * * *

UNITED STATES PATENT AND TRADEMARK OFFICE
CERTIFICATE OF CORRECTION

PATENT NO. : 3,962,102
DATED : June 8, 1976
INVENTOR(S) : C. W. Crowe

It is certified that error appears in the above-identified patent and that said Letters Patent are hereby corrected as shown below:

Column 3, line 42, delete "claim 3" and insert --claim 2--.

Column 3, line 44, delete "claim 4" and insert --claim 3--.

Column 4, line 39, delete "claim 7" and insert --claim 6--.

Column 4, line 41, delete "claim 10" and insert --claim 8--.

Column 4, line 46, delete "claim 7" and insert --claim 6--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*